(12) United States Patent
Kotake et al.

(10) Patent No.: US 10,227,455 B2
(45) Date of Patent: Mar. 12, 2019

(54) AEROGEL

(71) Applicant: HITACHI CHEMICAL COMPANY, LTD., Tokyo (JP)

(72) Inventors: Tomohiko Kotake, Tokyo (JP); Tatsuya Makino, Tokyo (JP); Chisato Kikkawa, Tokyo (JP); Hiroyuki Izumi, Tokyo (JP); Masato Miyatake, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/755,914

(22) PCT Filed: Aug. 29, 2016

(86) PCT No.: PCT/JP2016/075224
§ 371 (c)(1),
(2) Date: Feb. 27, 2018

(87) PCT Pub. No.: WO2017/038775
PCT Pub. Date: Mar. 9, 2017

(65) Prior Publication Data
US 2018/0327548 A1    Nov. 15, 2018

(30) Foreign Application Priority Data
Sep. 1, 2015 (JP) .................. 2015-171856

(51) Int. Cl.
*C08G 77/18* (2006.01)
*B01J 13/00* (2006.01)
*C08G 77/00* (2006.01)

(52) U.S. Cl.
CPC .......... *C08G 77/18* (2013.01); *B01J 13/0091* (2013.01); *C08G 77/70* (2013.01)

(58) Field of Classification Search
CPC .................................................. C08G 77/18
See application file for complete search history.

(56) References Cited

U.S. PATENT DOCUMENTS

| 4,402,927 A | 9/1983 | Dardel et al. |
| 2006/0194026 A1* | 8/2006 | Blair ............... E04B 1/76 428/174 |

FOREIGN PATENT DOCUMENTS

| JP | 07-185306 A | 7/1995 |
| JP | 2000-026609 A | 1/2000 |
| JP | 2000-264620 A | 9/2000 |
| JP | 2001-504756 A | 4/2001 |
| JP | 2011-093744 A | 5/2011 |
| JP | 2012-233110 A | 11/2012 |
| JP | 5250900 B2 | 7/2013 |
| JP | 2014-502305 A | 1/2014 |
| JP | 2015-523456 A | 8/2015 |
| WO | 2007/010949 A1 | 1/2007 |

OTHER PUBLICATIONS

Granted claims in JP 2017-538023 and English language translation thereof.
Decision to grant a patent in JP 2017-538023 and English language translation thereof.
International Search Report dated Oct. 11, 2016, for Int'l App. PCT/JP2016/075224 and English language translation thereof.
Written Opinion of the International Searching Authority dated Oct. 11, 2016, for Int'l App. PCT/JP2016/075224 and English language translation thereof.

* cited by examiner

*Primary Examiner* — Kuo Liang Peng
(74) *Attorney, Agent, or Firm* — Fitch, Even, Tabin & Flannery, LLP

(57) ABSTRACT

Aerogel is a dried product of wet gel being a condensate of sol containing at least one selected from the group consisting of a polysiloxane compound having a hydrolyzable functional group or a condensable functional group and having an average molecular weight of 300 to 1500 g/mol, and a hydrolysis product of the polysiloxane compound having a hydrolyzable functional group.

7 Claims, No Drawings

AEROGEL

CROSS-REFERENCE TO RELATED APPLICATIONS

This application is a U.S. national phase application filed under 35 U.S.C. § 371 of International Application No. PCT/JP2016/075224, filed Aug. 29, 2016, which claims priority from Japanese Patent Application No. 2015-171856, filed Sep. 1, 2015, designating the United States, which are hereby incorporated herein by reference in their entirety.

TECHNICAL FIELD

The present invention relates to aerogel excellent in thermal insulation properties and productivity.

BACKGROUND ART

Silica aerogel is known as a material having small thermal conductivity and having thermal insulation properties. The silica aerogel is useful as a functional material having excellent functionality (thermal insulation properties, etc.), specific optical properties, specific electric properties, etc., and is used in, for example, electronic substrate materials that exploit the ultralow dielectric properties of the silica aerogel, thermal insulating materials that exploit the high thermal insulation properties of the silica aerogel, and light reflective materials that exploit the ultralow refractive index of the silica aerogel.

A supercritical drying method of hydrolyzing an alkoxysilane, polymerizing the resultant, and drying the obtained gelled compound (alcogel) under supercritical conditions of a dispersion medium is known as a method for manufacturing such silica aerogel (see, for example, Patent Literature 1). The supercritical drying method is a method of introducing alcogel and a dispersion medium (solvent used in drying) into a high-pressure vessel, preparing the dispersion medium into a supercritical fluid by the application of a temperature and a pressure equal to or higher than its critical point, and thereby removing the solvent contained in the alcogel. However, since the supercritical drying method requires a high-pressure process, investment in equipment such as a special apparatus capable of resisting supercriticality is necessary, and furthermore, a great deal of labor and time are necessary.

Accordingly, an approach of drying alcogel by using a general-purpose method that does not require the high-pressure process has been proposed. For example, a method of using a monoalkyltrialkoxysilane and a tetraalkoxysilane in combination at a particular ratio as gel raw materials so that the resulting alcogel is improved in strength and dried at normal pressure is known as such a method (see, for example, Patent Literature 2). However, in the case of adopting such drying under normal pressure, the gel tends to shrink due to stress caused by capillary force in the inside of the alcogel.

CITATION LIST

Patent Literature

Patent Literature 1: U.S. Pat. No. 4,402,927
Patent Literature 2: Japanese Unexamined Patent Publication No. 2011-93744

SUMMARY OF INVENTION

Technical Problem

As mentioned above, studies from various viewpoints have been conducted on the problems associated with conventional manufacturing processes, whereas the obtained aerogel, even if any of the processes described above is adopted, is poorly handleable and difficult to increase in size and therefore has challenges to productivity. For example, monolithic aerogel obtained by the processes may be broken by mere lifting by the hand. This is presumed to be derived from the low density of the aerogel and the pore structure carried by the aerogel where fine particles on the order of 10 nm are merely weakly connected.

A method of imparting flexibility to gel by increasing the pore size of the gel to about a micrometer scale is possible as an approach for remedying such problems of conventional aerogel. However, the aerogel thus obtained has the problem that thermal conductivity increases drastically, and the excellent thermal insulation properties of the aerogel are lost.

The present invention has been made in light of the situation described above, and an object thereof is to provide aerogel excellent in thermal insulation properties and productivity.

Solution to Problem

The present inventor has conducted diligent studies to attain the object and consequently found that by using a polysiloxane compound having a particular range of a molecular weight, excellent thermal insulation properties are exerted in preparing aerogel while handleability improves and increase in size is also possible, and therefore, productivity can be enhanced, reaching the completion of the present invention.

The present invention provides aerogel being a dried product of wet gel being a condensate of sol containing at least one selected from the group consisting of a polysiloxane compound having a hydrolyzable functional group or a condensable functional group and having an average molecular weight of 300 to 1500 g/mol, and a hydrolysis product of the polysiloxane compound having a hydrolyzable functional group. The aerogel thus obtained is excellent in thermal insulation properties and productivity.

The aerogel of the present invention can have a structure represented by the following formula (1). Such aerogel is excellent in thermal insulation properties and productivity. Thermal conductivity and the compressive modulus of elasticity are easily controlled to particular ranges by introducing the structure represented by the following formula (1) into the skeleton of the aerogel.

[Chemical Formula 1]

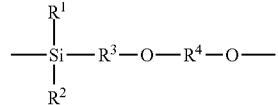

In the formula (1), $R^1$ and $R^2$ each independently represent an alkyl group or an aryl group, and $R^3$ and $R^4$ each independently represent an alkylene group.

The aerogel of the present invention can have a structure represented by the following formula (1a) as a structure including the structure represented by the above formula (1).

[Chemical Formula 2]

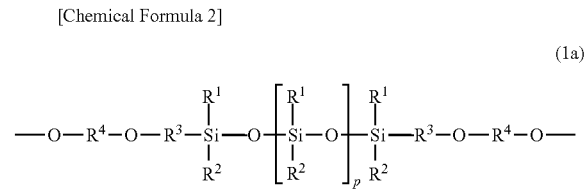

(1a)

In the formula (1a), $R^1$ and $R^2$ each independently represent an alkyl group or an aryl group, $R^3$ and $R^4$ each independently represent an alkylene group, and p represents an integer of 3 to 15.

The aerogel of the present invention can have a ladder-type structure having struts and bridges, wherein the bridges are represented by the following formula (2). Such aerogel has excellent flexibility attributed to the ladder-type structure while maintaining the thermal insulation properties of the aerogel itself

[Chemical Formula 3]

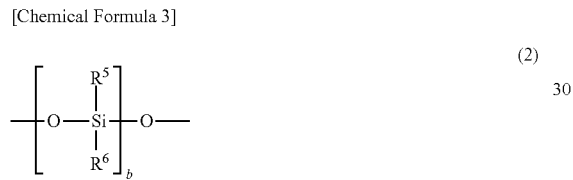

(2)

In the formula (2), $R^5$ and $R^6$ each independently represent an alkyl group or an aryl group, and b represents an integer of 3 to 15.

The aerogel having a ladder-type structure includes one having a ladder-type structure represented by the following formula (3). By this, much better thermal insulation properties and flexibility can be achieved.

[Chemical Formula 4]

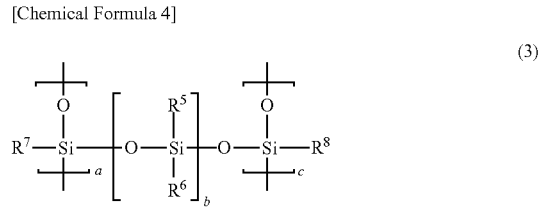

(3)

In the formula (3), $R^5$, $R^6$, $R^7$ and $R^8$ each independently represent an alkyl group or an aryl group, a and c each independently represent an integer of 1 to 3000, and b represents an integer of 3 to 15.

The condensable functional group includes a hydroxyalkyl group, and the number of carbon atoms of the hydroxyalkyl group can be set to 1 to 6. By this, aerogel having much better thermal insulation properties and flexibility is prepared.

In the case where the condensable functional group is a hydroxyalkyl group, the polysiloxane compound includes one represented by the following formula (A). By this, much better thermal insulation properties and flexibility can be achieved.

[Chemical Formula 5]

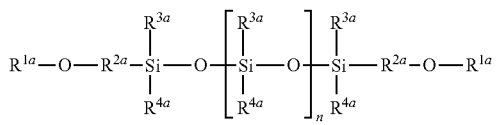

(A)

In the formula (A), $R^{1a}$ represents a hydroxyalkyl group, $R^{2a}$ represents an alkylene group, $R^{3a}$ and $R^{4a}$ each independently represent an alkyl group or an aryl group, and n represents an integer of 3 to 15.

In the present invention, the hydrolyzable functional group includes an alkoxy group, and the number of carbon atoms of the alkoxy group can be set to 1 to 6. By this, aerogel having much better thermal insulation properties and flexibility is prepared.

In the case where the hydrolyzable functional group is an alkoxy group, the polysiloxane compound includes one represented by the following formula (B). By this, much better thermal insulation properties and flexibility can be achieved.

[Chemical Formula 6]

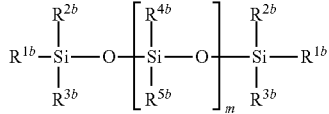

(B)

In the formula (B), $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 3 to 15.

In the present invention, the sol may further contain at least one selected from the group consisting of a silicon compound (except for the polysiloxane compound) having a hydrolyzable functional group or a condensable functional group, and a hydrolysis product of the silicon compound having a hydrolyzable functional group. By this, much better thermal insulation properties and productivity can be achieved.

The dried product can be obtained by drying performed at a temperature lower than a critical point of a solvent used in the drying of the wet gel, and under atmospheric pressure. By this, aerogel excellent in thermal insulation properties and productivity is more easily obtained.

Advantageous Effects of Invention

According to the present invention, aerogel excellent in thermal insulation properties and productivity can be provided. Specifically, by using a polysiloxane compound having a particular range of a molecular weight, excellent thermal insulation properties are exerted in preparing aerogel while handleability improves and increase in size is also possible, and therefore, productivity can be enhanced.

DESCRIPTION OF EMBODIMENTS

Hereinafter, preferred embodiments of the present invention will be described in detail. However, the present invention is not limited by the following embodiments.

<Definition>

In the present specification, a numerical range represented by using "to" means a range including the numerical values described before and after "to" as the minimum value and the maximum value, respectively. In numerical ranges described in stages in the present specification, the upper limit value or the lower limit value of a numerical range of a certain stage may be replaced with the upper limit value or the lower limit value of a numerical range of a different stage. In a numerical range described in the present specification, the upper limit value or the lower limit value of the numerical range may be replaced with a value shown in Examples. "A or B" needs only to include either A or B and may include both. Materials listed in the present specification can be used each alone or in combination of two or more thereof, unless otherwise specified. In the present specification, in the case where a plurality of substances corresponding to each component are present in a composition, the content of each component in the composition means the total amount of the plurality of substances present in the composition, unless otherwise specified.

<Aerogel>

Although dry gel obtained by using a supercritical drying method for wet gel is called aerogel; dry gel obtained by drying under atmospheric pressure is called xerogel; and dry gel obtained by freeze drying is called cryogel in the narrow sense, low-density dry gel obtained regardless of these drying approaches of wet gel is referred to as "aerogel" in the present embodiment. Specifically, in the present embodiment, the aerogel means "gel comprised of a microporous solid in which the dispersed phase is a gas" which is aerogel in the broad sense. In general, the inside of the aerogel has a network microstructure and has a cluster structure where aerogel particles (particles constituting the aerogel) on the order of 2 to 20 nm are bonded. Pores smaller than 100 nm reside between skeletons formed by this cluster. By this, the aerogel has a three-dimensionally fine and porous structure. The aerogel according to the present embodiment is, for example, silica aerogel composed mainly of silica. Examples of the silica aerogel include so-called organic-inorganic hybridized silica aerogel in which an organic group (a methyl group, etc.) or an organic chain is introduced. The aerogel of the present embodiment is excellent in thermal insulation properties and productivity (flexibility).

The aerogel of the present embodiment is a dried product of wet gel being a condensate of sol (one obtained by drying wet gel produced from the sol) containing at least one selected from the group consisting of a polysiloxane compound having a hydrolyzable functional group or a condensable functional group (in the molecule) and having an average molecular weight of 300 to 1500 g/mol, and a hydrolysis product of the polysiloxane compound having a hydrolyzable functional group (hereinafter, referred to as the "polysiloxane compound group" in some cases). Aerogel excellent in thermal insulation properties and productivity can be obtained by setting the average molecular weight of the polysiloxane compound to this range.

The hydrolyzable functional group and the condensable functional group in the polysiloxane compound are not particularly limited. Examples of the hydrolyzable functional group include alkoxy groups. Examples of the condensable functional group (except for functional groups corresponding to the hydrolyzable functional group) include a hydroxy group, silanol groups, a carboxyl group and a phenolic hydroxy group. The hydroxy group may be included in a hydroxy group-containing group such as a hydroxyalkyl group. The polysiloxane compound having a hydrolyzable functional group or a condensable functional group may further have a reactivity group different from the hydrolyzable functional group and the condensable functional group (functional group that corresponds neither to the hydrolyzable functional group nor to the condensable functional group). Examples of the reactivity group include an epoxy group, a mercapto group, a glycidoxy group, a vinyl group, an acryloyl group, a methacryloyl group and an amino group. The epoxy group may be included in an epoxy group-containing group such as a glycidoxy group. The polysiloxane compound having these functional groups and reactive groups may be used alone or by mixing two or more types. Among these functional groups and reactive groups, alkoxy groups, silanol groups, and hydroxyalkyl groups can further improve the flexibility of the aerogel, and furthermore, alkoxy groups and hydroxyalkyl groups can further improve the compatibility of sol. The number of carbon atoms of each of the alkoxy groups and the hydroxyalkyl groups can be set to 1 to 6 from the viewpoint of improvement in the reactivity of the polysiloxane compound and reduction in the thermal conductivity of the aerogel, but may be further set to 2 to 4 from the viewpoint of further improving the flexibility of the aerogel.

The average molecular weight of the polysiloxane compound can be set to 300 g/mol or larger from the viewpoint of further improving the flexibility of the aerogel, but may be set to 500 g/mol or larger. On the other hand, it can be set to 1500 g/mol or smaller from the viewpoint of further improving the compatibility of sol, but may be set to 1200 g/mol or smaller. Specifically, the average molecular weight of the polysiloxane compound can be set to 300 to 1500 g/mol, but may be set to 500 to 1200 g/mol.

In the present embodiment, the average molecular weight can be measured from an average molecular weight (Mw) calculated on the basis of polystyrene by using GPC (gel permeation chromatography). Specifically, it can be detected with RI (refractive index detector) by using a toluene eluent.

Examples of the polysiloxane compound having a hydroxyalkyl group include one having a structure represented by the following formula (A).

[Chemical Formula 7]

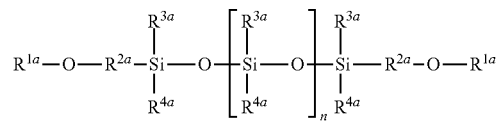

(A)

In the formula (A), $R^{1a}$ represents a hydroxyalkyl group, $R^{2a}$ represents an alkylene group, $R^{3a}$ and $R^{4a}$ each independently represent an alkyl group or an aryl group, and n represents an integer of 3 to 15. In this context, examples of the aryl group include a phenyl group and a substituted phenyl group. Also, examples of the substituent of the substituted phenyl group include alkyl groups, a vinyl group, a mercapto group, an amino group, a nitro group and a cyano group. In the formula (A), two $R^{1a}$ may be the same as or different from each other, and likewise, two $R^{2a}$ may be the same as or different from each other. Also, in the formula (A), two or more $R^{3a}$ may be the same as or different from each other, and likewise, two or more $R^{4a}$ may be the same as or different from each other.

Aerogel that has low thermal conductivity and is flexible is more easily obtained by using wet gel being a condensate of sol (produced from the sol) containing a polysiloxane compound having the structure described above. From such a viewpoint, in the formula (A), examples of $R^{1a}$ include hydroxyalkyl groups having 1 to 6 carbon atoms, and examples of the hydroxyalkyl groups include a hydroxyethyl group and a hydroxypropyl group. Also, in the formula (A), examples of $R^{2a}$ include alkylene groups having 1 to 6 carbon atoms, and examples of the alkylene groups include an ethylene group and a propylene group. Also, in the formula (A), examples of $R^{3a}$ and $R^{4a}$ each independently include alkyl groups having 1 to 6 carbon atoms and a phenyl group, and examples of the alkyl groups include a methyl group. Also, in the formula (A), n can be set to 3 to 15, but may be further set to 6 to 12.

A commercially available product can be used as the polysiloxane compound having a structure represented by the above formula (A), and examples thereof include compounds such as X-22-160AS, KF-6001, KF-6002, and KF-6003 (all manufactured by Shin-Etsu Chemical Co., Ltd.), and compounds such as XF42-B0970 and Fluid OFOH 702-4% (all manufactured by Momentive Performance Materials Inc.).

Examples of the polysiloxane compound having an alkoxy group include one having a structure represented by the following formula (B).

[Chemical Formula 8]

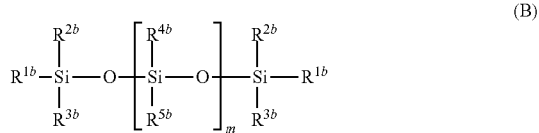

(B)

In the formula (B), $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 3 to 15. In this context, examples of the aryl group include a phenyl group and a substituted phenyl group. Also, examples of the substituent of the substituted phenyl group include alkyl groups, a vinyl group, a mercapto group, an amino group, a nitro group and a cyano group. In the formula (B), two $R^{1b}$ may be the same as or different from each other, two $R^{2b}$ may be the same as or different from each other, and likewise, two $R^{3b}$ may be the same as or different from each other. Also, in the formula (B), two or more $R^{4b}$ may be the same as or different from each other, and likewise, two or more $R^{5b}$ may also be the same as or different from each other.

Aerogel that has low thermal conductivity and is flexible is more easily obtained by using wet gel being a condensate of sol (produced from the sol) containing a polysiloxane compound having the structure described above or a hydrolysis product thereof. From such a viewpoint, in the formula (B), examples of $R^{1b}$ include alkyl groups having 1 to 6 carbon atoms and alkoxy groups having 1 to 6 carbon atoms, and examples of the alkyl groups or the alkoxy groups include a methyl group, a methoxy group and an ethoxy group. Also, in the formula (B), examples of $R^{2b}$ and $R^{3b}$ each independently include alkoxy groups having 1 to 6 carbon atoms, and examples of the alkoxy groups include a methoxy group and an ethoxy group. Also, in the formula (B), examples of $R^{4b}$ and $R^{5b}$ each independently include alkyl groups having 1 to 6 carbon atoms and a phenyl group, and examples of the alkyl groups include a methyl group. Also, in the formula (B), m can be set to 3 to 15, but may be further set to 6 to 12.

The polysiloxane compound having a structure represented by the above formula (B) can be obtained by appropriately referring to manufacturing methods reported in, for example, Japanese Unexamined Patent Publication No. 2000-26609 and Japanese Unexamined Patent Publication No. 2012-233110.

Since an alkoxy group hydrolyzes, there is a possibility that a polysiloxane compound having an alkoxy group exists as a hydrolysis product in sol, and the polysiloxane compound having an alkoxy group and a hydrolysis product thereof may coexist. Also, in the polysiloxane compound having an alkoxy group, all alkoxy groups in the molecule may be hydrolyzed or may be partially hydrolyzed.

These polysiloxane compounds having a hydrolyzable functional group or a condensable functional group, and hydrolysis products of the polysiloxane compounds having a hydrolyzable functional group may be used alone or by mixing two or more types.

For preparing the aerogel of the present embodiment, the sol containing a polysiloxane compound or a hydrolysis product thereof may contain a silicon compound other than the polysiloxane compound. Specifically, the sol of the present embodiment can further contain at least one selected from the group consisting of a silicon compound (except for the polysiloxane compound) having a hydrolyzable functional group or a condensable functional group, and a hydrolysis product of the silicon compound having a hydrolyzable functional group (hereinafter, referred to as the "silicon compound group" in some cases). The number of silicon atoms in the molecule of the silicon compound can be set to 1 or 2.

Examples of the silicon compound having a hydrolyzable functional group include, but are not particularly limited to, alkyl silicon alkoxides. Among the alkyl silicon alkoxides, one having 3 or less hydrolyzable functional groups can further improve water resistance. Examples of such alkyl silicon alkoxides include monoalkyltrialkoxysilanes, monoalkyldialkoxysilanes, dialkyldialkoxysilanes, monoalkylmonoalkoxysilanes, dialkylmonoalkoxysilanes, and trialkylmonoalkoxysilanes and specifically include methyltrimethoxysilane, methyldimethoxysilane, dimethyldimethoxysilane, and ethyltrimethoxysilane.

Examples of the silicon compound having a condensable functional group include, but are not particularly limited to, silanetetraol, methylsilanetriol, dimethylsilanediol, phenylsilanetriol, phenylmethylsilanediol, diphenylsilanediol, n-propylsilanetriol, hexylsilanetriol, octylsilanetriol, decylsilanetriol and trifluoropropylsilanetriol.

The silicon compound having a hydrolyzable functional group or a condensable functional group may further have the reactive group mentioned above, which is different from the hydrolyzable functional group and the condensable functional group.

Vinyltrimethoxysilane, 3-glycidoxypropyltrimethoxysilane, 3-glycidoxypropylmethyldimethoxysilane, 3-methacryloxypropyltrimethoxysilane, 3-methacryloxypropylmethyldimethoxysilane, 3-acryloxypropyltrimethoxysilane, 3-mercaptopropyltrimethoxysilane, 3-mercaptopropylmethyldimethoxysilane, N-phenyl-3-aminopropyltrimethoxysilane, N-2-(aminoethyl)-3-aminopropylmethyldimethoxysilane or the like can also be used as the silicon compound having three or less hydrolyzable functional groups and having a reactivity group.

Also, vinylsilanetriol, 3-glycidoxypropylsilanetriol, 3-glycidoxypropylmethylsilanediol, 3-methacryloxypropylsilanetriol, 3-methacryloxypropylmethylsilanediol, 3-acryloxypropylsilanetriol, 3-mercaptopropylsilanetriol, 3-mercaptopropylmethylsilanediol, N-phenyl-3-aminopropylsilanetriol, N-2-(aminoethyl)-3-aminopropylmethylsilanediol or the like can also be used as the silicon compound having a condensable functional group and having a reactivity group.

Furthermore, bistrimethoxysilylmethane, bistrimethoxysilylethane, bistrimethoxysilylhexane ethyltrimethoxysilane, vinyltrimethoxysilane or the like, which is a silicon compound having 3 or less hydrolyzable functional groups at the molecular end, can also be used.

These silicon compounds having a hydrolyzable functional group or a condensable functional group, and hydrolysis products of the silicon compounds having a hydrolyzable functional group may be used alone or by mixing two or more types.

The content of the polysiloxane compound group (the sum of the content of the polysiloxane compound having a hydrolyzable functional group or a condensable functional group, and the content of the hydrolysis product of the polysiloxane compound having a hydrolyzable functional group) contained in the sol can be set to 5 parts by mass or more and may be 10 parts by mass or more, with respect to 100 parts by mass in total of the sol. The content can be set to 50 parts by mass or less and may be 30 parts by mass or less, with respect to 100 parts by mass in total of the sol. Specifically, the content of the polysiloxane compound group can be set to 5 to 50 parts by mass, but may be further set to 10 to 30 parts by mass, with respect to 100 parts by mass in total of the sol. It is set to 5 parts by mass or more, whereby good reactivity is more easily obtained; and it is set to 50 parts by mass or less, whereby good compatibility is more easily obtained.

In the case where the sol further contains the silicon compound, the ratio between the content of the polysiloxane compound group and the content of the silicon compound group (the sum of the content of the silicon compound having a hydrolyzable functional group or a condensable functional group, and the content of the hydrolysis product of the silicon compound having a hydrolyzable functional group) can be set to 1:0.5 to 1:4, but may be further set to 1:1 to 1:2. The ratio between the contents of these compounds is set to 1:0.5 or more, whereby good compatibility is more easily obtained; and it is set to 1:4 or less, whereby the shrinkage of gel is more easily suppressed.

The sum of the contents of the polysiloxane compound group and the silicon compound group can be set to 5 parts by mass or more and may be 10 parts by mass or more, with respect to 100 parts by mass in total of the sol. The sum of the contents can be set to 50 parts by mass or less and may be 30 parts by mass or less, with respect to 100 parts by mass in total of the sol. Specifically, the sum of the contents of the polysiloxane compound group and the silicon compound group can be set to 5 to 50 parts by mass, but may be further set to 10 to 30 parts by mass, with respect to 100 parts by mass in total of the sol. It is set to 5 parts by mass or more, whereby good reactivity is more easily obtained; and it is set to 50 parts by mass or less, whereby good compatibility is more easily obtained. In this respect, the ratio between the contents of the polysiloxane compound group and the silicon compound group can be set to within the range described above.

<Specific Aspect of Aerogel>

The aerogel of the present embodiment is a dried product of wet gel being a condensate of the sol (is obtained by drying wet gel produced from the sol) containing at least one selected from the group consisting of a polysiloxane compound having a hydrolyzable functional group or a condensable functional group and having an average molecular weight of 300 to 1500 g/mol, and a hydrolysis product of the polysiloxane compound having a hydrolyzable functional group. The condensate may be obtained by the condensation reaction of a hydrolysis product obtained by the hydrolysis of the polysiloxane compound having a hydrolyzable functional group, or may be obtained by the condensation reaction of the polysiloxane compound having a condensable functional group which is not a functional group obtained by hydrolysis. The polysiloxane compound can have at least one of the hydrolyzable functional group and the condensable functional group and may have both of the hydrolyzable functional group and the condensable functional group.

The aerogel of the present embodiment can contain polysiloxane having a principal chain including a siloxane bond (Si—O—Si). The aerogel can have the following M unit, D unit, T unit or Q unit as a structural unit.

[Chemical Formula 9]

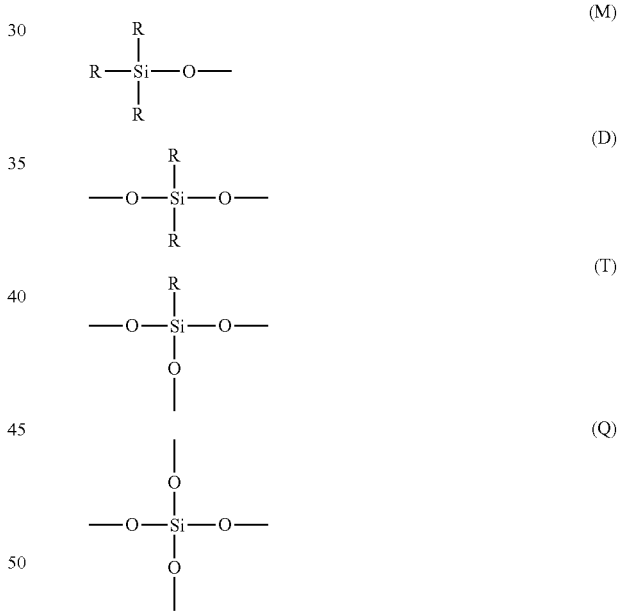

In the above formulas, R represents an atom (a hydrogen atom, etc.) or an atomic group (an alkyl group, etc.) bonded to the silicon atom. The M unit is a unit consisting of a monovalent group in which the silicon atom is bonded to one oxygen atom. The D unit is a unit consisting of a divalent group in which the silicon atom is bonded to two oxygen atoms. The T unit is a unit consisting of a trivalent group in which the silicon atom is bonded to three oxygen atoms. The Q unit is a unit consisting of a tetravalent group in which the silicon atom is bonded to four oxygen atoms. Information on the contents of these units can be obtained by Si-NMR.

Examples of the aerogel of the present embodiment include one having structures given below. The aerogel has these structures and thereby easily exerts excellent thermal conductivity and compressive modulus of elasticity. In the present embodiment, the aerogel may have any of the structures given below.

The aerogel of the present embodiment can have a structure represented by the following formula (1). The aerogel of the present embodiment can have a structure represented by the following formula (1a) as a structure including the structure represented by the formula (1). The structures represented by the formula (1) and the formula (1a) can be introduced into the skeleton of the aerogel by using the polysiloxane compound having a structure represented by the above formula (A).

[Chemical Formula 10]

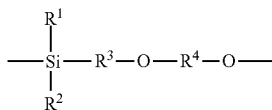
(1)

[Chemical Formula 11]

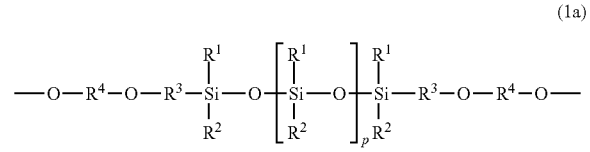
(1a)

In the formula (1) and the formula (1a), $R^1$ and $R^2$ each independently represent an alkyl group or an aryl group, and $R^3$ and $R^4$ each independently represent an alkylene group. In this context, examples of the aryl group include a phenyl group and a substituted phenyl group. Examples of the substituent of the substituted phenyl group include alkyl groups, a vinyl group, a mercapto group, an amino group, a nitro group and a cyano group. p represents an integer of 3 to 15. In the formula (1a), two or more $R^1$ may be the same as or different from each other, and likewise, two or more $R^2$ may be the same as or different from each other. In the formula (1a), two $R^3$ may be the same as or different from each other, and likewise, two $R^4$ may be the same as or different from each other.

Aerogel that has low thermal conductivity and is flexible is prepared by introducing the structure represented by the above formula (1) or formula (1a) into the skeleton of the aerogel. From such a viewpoint, in the formula (1) and the formula (1a), examples of $R^1$ and $R^2$ each independently include alkyl groups having 1 to 6 carbon atoms and a phenyl group, and examples of the alkyl groups include a methyl group. Also, in the formula (1) and the formula (1a), examples of $R^3$ and $R^4$ each independently include alkylene groups having 1 to 6 carbon atoms, and examples of the alkylene groups include an ethylene group and a propylene group. In the formula (1a), p can be set to 3 to 15 and may be 6 to 12.

The aerogel of the present embodiment may be aerogel having a ladder-type structure having struts and bridges, wherein the bridges represented by the following formula (2). Heat resistance and mechanical strength can be improved by introducing such a ladder-type structure into the skeleton of the aerogel. The ladder-type structure having the bridges represented by the formula (2) can be introduced into the skeleton of the aerogel by using the polysiloxane compound having a structure represented by the above formula (B). In the present embodiment, the "ladder-type structure" is a structure having two struts and bridges connecting the struts (structure having the form of a so-called "ladder"). In this aspect, the aerogel skeleton may consist of a ladder-type structure, or the aerogel may partially have a ladder-type structure.

[Chemical Formula 12]

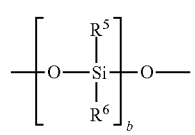
(2)

In the formula (2), $R^5$ and $R^6$ each independently represent an alkyl group or an aryl group, and b represents an integer of 3 to 15. In this context, examples of the aryl group include a phenyl group and a substituted phenyl group. Also, examples of the substituent of the substituted phenyl group include alkyl groups, a vinyl group, a mercapto group, an amino group, a nitro group and a cyano group. In the formula (2), two or more $R^5$ may be the same as or different from each other, and likewise, two or more $R^6$ may also be the same as or different from each other.

For example, aerogel having better flexibility than that of conventional aerogel having a structure derived from ladder-type silsesquioxane (i.e., having a structure represented by the following formula (X)) is prepared by introducing the structure described above into the skeleton of the aerogel. The silsesquioxane is polysiloxane having the composition formula: $(RSiO_{1.5})_n$ and can have various skeletal structures such as cage type, ladder type, and random type. As shown in the following formula (X), the structure of the bridges in the conventional aerogel having a structure derived from ladder-type silsesquioxane is —O— (has the T unit as a structural unit), whereas the structure of the bridges in the aerogel of this aspect is a structure represented by the above formula (2) (polysiloxane structure). However, the aerogel of the present embodiment may have a structure derived from silsesquioxane, in addition to the structures represented by the formulas (1) to (3).

[Chemical Formula 13]

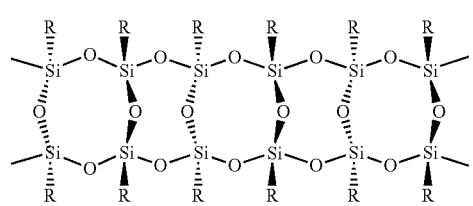
(X)

In the formula (X), R represents a hydroxy group, an alkyl group or an aryl group.

Although the structures serving as the struts and the chain length thereof, and the intervals between the structures serving as the bridges are not particularly limited, examples of the ladder-type structure include a ladder-type structure represented by the following formula (3) from the viewpoint of further improving heat resistance and mechanical strength.

[Chemical Formula 14]

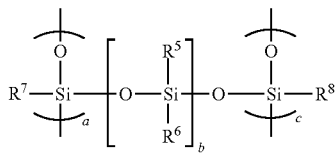

(3)

In the formula (3), $R^5$, $R^6$, $R^7$ and $R^8$ each independently represent an alkyl group or an aryl group, a and c each independently represent an integer of 1 to 3000, and b represents an integer of 3 to 15. In this context, examples of the aryl group include a phenyl group and a substituted phenyl group. Also, examples of the substituent of the substituted phenyl group include alkyl groups, a vinyl group, a mercapto group, an amino group, a nitro group and a cyano group. In the formula (3), two or more $R^5$ may be the same as or different from each other, and likewise, two or more $R^6$ may also be the same as or different from each other. Also, in the formula (3), in the case where a is an integer of 2 or larger, two or more $R^7$ may be the same as or different from each other, and likewise, in the case where c is an integer of 2 or larger, two or more $R^8$ may be the same as or different from each other.

In the formulas (2) and (3), examples of $R^5$, $R^6$, $R^7$ and $R^8$ (however, $R^7$ and $R^8$ are only in the formula (3)) each independently include alkyl groups having 1 to 6 carbon atoms and a phenyl group from the viewpoint of obtaining much better flexibility, and examples of the alkyl groups include a methyl group. From a similar viewpoint, in the formula (3), a and c can each independently be set to 6 to 2000, but may each independently be set to 10 to 1000. From a similar viewpoint, in the formulas (2) and (3), b can be set to 3 to 15, but may be set to 6 to 12.

<Method for Manufacturing Aerogel>

Next, the method for manufacturing the aerogel will be described. Although the method for manufacturing the aerogel is not particularly limited, the manufacture can be performed by, for example, the following method.

Specifically, the aerogel of the present embodiment can be manufactured by a manufacturing method mainly comprising: a sol production step; a wet gel production step of gelling the sol obtained in the sol production step, followed by aging to obtain wet gel; a step of subjecting the wet gel obtained in the wet gel production step to washing and solvent replacement; and a drying step of drying the washed and solvent-replaced wet gel. The "sol" means a state before gelling reaction occurs, and in the present embodiment, a state where the polysiloxane compound group and, optionally, the silicon compound group are dissolved or dispersed in a solvent. Also, the wet gel means gel solid matter in a wet state lacking fluidity, even though including a liquid medium.

Hereinafter, each step of the method for manufacturing the aerogel of the present embodiment will be described.

(Sol Production Step)

The sol production step is a step of mixing the polysiloxane compound mentioned above and, optionally, the silicon compound with a solvent, and performing hydrolysis to produce sol. In this step, an acid catalyst can be further added into the solvent in order to accelerate the hydrolysis reaction. Also, as shown in Japanese Patent No. 5250900, a surfactant, a thermally hydrolyzable compound or the like can also be added into the solvent.

For example, water or a mixed solution of water and an alcohol can be used as the solvent. Examples of the alcohol include methanol, ethanol, n-propanol, 2-propanol, n-butanol, 2-butanol and t-butanol. Among these, examples of an alcohol having low surface tension, which facilitates reducing interfacial tension with gel walls, and having a low boiling point include methanol, ethanol, and 2-propanol. These may be used alone or by mixing two or more types.

In the case of using, for example, an alcohol as the solvent, the amount of the alcohol can be set to 4 to 8 mol, but may be further set to 4 to 6.5 mol and may be set to 4.5 to 6 mol, with respect to 1 mol in total of the polysiloxane compound group and the silicon compound group. The amount of the alcohol is set to 4 mol or more, whereby good compatibility is more easily obtained; and it is set to 8 mol or less, whereby the shrinkage of gel is more easily suppressed.

Examples of the acid catalyst include: inorganic acids such as hydrofluoric acid, hydrochloric acid, nitric acid, sulfuric acid, sulfurous acid, phosphoric acid, phosphorous acid, hypophosphorous acid, bromic acid, chloric acid, chlorous acid, and hypochlorous acid; acidic phosphates such as acidic aluminum phosphate, acidic magnesium phosphate, and acidic zinc phosphate; and organic carboxylic acids such as acetic acid, formic acid, propionic acid, oxalic acid, malonic acid, succinic acid, citric acid, malic acid, adipic acid, and azelaic acid. Among these, examples of an acid catalyst further improving the water resistance of the resulting aerogel include organic carboxylic acids. Examples of the organic carboxylic acids include acetic acid, but formic acid, propionic acid, oxalic acid, or malonic acid or the like is also acceptable. These may be used alone or by mixing two or more types.

The sol can be obtained in a shorter time by using the acid catalyst and thereby accelerating the hydrolysis reaction of the polysiloxane compound and the silicon compound.

The amount of the acid catalyst added can be set to 0.001 to 0.1 parts by mass with respect to 100 parts by mass in total of the polysiloxane compound group and the silicon compound group.

A nonionic surfactant, an ionic surfactant or the like can be used as the surfactant. These may be used alone or by mixing two or more types.

For example, compound including a hydrophilic moiety such as polyoxyethylene and a hydrophobic moiety consisting mainly of an alkyl group, or compound including a hydrophilic moiety such as polyoxypropylene can be used as the nonionic surfactant. Examples of the compound including a hydrophilic moiety such as polyoxyethylene and a hydrophobic moiety consisting mainly of an alkyl group include polyoxyethylene nonyl phenyl ether, polyoxyethylene octyl phenyl ether, and polyoxyethylene alkyl ethers. Examples of the compound including a hydrophilic moiety such as polyoxypropylene include polyoxypropylene alkyl ethers and block copolymers of polyoxyethylene and polyoxypropylene.

Examples of the ionic surfactant include a cationic surfactant, an anionic surfactant, and an amphoteric surfactant. Examples of the cationic surfactant include cetyl trimethyl ammonium bromide and cetyl trimethyl ammonium chloride. Examples of the anionic surfactant include sodium dodecylsulfonate. Also, examples of the amphoteric surfactant include amino acid-based surfactants and betaine-based surfactants and amine oxide-based surfactants. Examples of the amino acid-based surfactants include acylglutamic acid. Examples of the betaine-based surfactants include lauryl dimethylaminoacetic acid betaine and stearyl dimethylaminoacetic acid betaine. Examples of the amine oxide-based surfactants include lauryl dimethylamine oxide.

These surfactants, in the wet gel production step mentioned later, have the effect of decreasing the difference in chemical affinity between the solvent in the reaction system and a growing siloxane polymer, and suppressing phase separation.

The amount of the surfactant added can be set to, for example, 1 to 100 parts by mass, but may be further set to 5 to 60 parts by mass, with respect to 100 parts by mass in total of the polysiloxane compound group and the silicon compound group, though also depending on the type of the surfactant, or the types and amounts of the polysiloxane compound and the silicon compound.

The thermally hydrolyzable compound generates a base catalyst by thermal hydrolysis so that the reaction solution is rendered basic to accelerate the sol-gel reaction in the wet gel production step mentioned later. Accordingly, this thermally hydrolyzable compound is not particularly limited as long as being a compound that can render the reaction solution basic after hydrolysis, and examples thereof can include: urea; acid amides such as formamide, N-methylformamide, N,N-dimethylformamide, acetamide, N-methylacetamide, and N,N-dimethylacetamide; and cyclic nitrogen compounds such as hexamethylenetetramine Among these, particularly, urea is more likely to produce the accelerating effect described above.

The amount of the thermally hydrolyzable compound added is not particularly limited as long as being an amount that can sufficiently accelerate the sol-gel reaction in the wet gel production step mentioned later. For example, in the case of using urea as the thermally hydrolyzable compound, the amount thereof added can be set to 1 to 200 parts by mass, but may be further set to 2 to 150 parts by mass, with respect to 100 parts by mass in total of the polysiloxane compound group and the silicon compound group. The amount added is set to 1 part by mass or more, whereby good reactivity is more easily obtained; and it is set to 200 parts by mass or less, whereby the deposition of crystals and decrease in gel density are more easily suppressed.

The hydrolysis in the sol production step may be performed, for example, for 10 minutes to 24 hours in a temperature environment of 20 to 60° C., and may be performed for 5 minutes to 8 hours in a temperature environment of 50 to 60° C., though also depending on the types and amounts of the polysiloxane compound, the silicon compound, the acid catalyst, the surfactant, etc. in the mixed solution. By this, the hydrolyzable functional groups in the polysiloxane compound and the silicon compound are sufficiently hydrolyzed so that a hydrolysis product of the polysiloxane compound and a hydrolysis product of the silicon compound can be more reliably obtained.

However, in the case of adding the thermally hydrolyzable compound into the solvent, the temperature environment in the sol production step may be adjusted to a temperature that suppresses the hydrolysis of the thermally hydrolyzable compound and suppresses the gelling of the sol. The temperature at this time may be any temperature as long as being a temperature that can suppress the hydrolysis of the thermally hydrolyzable compound. For example, in the case of using urea as the thermally hydrolyzable compound, the temperature environment in the sol production step can be set to 0 to 40° C., but may be further set to 10 to 30° C.

(Wet Gel Production Step)

The wet gel production step is a step of gelling the sol obtained in the sol production step, followed by aging to obtain wet gel. In this step, a base catalyst can be used for accelerating the gelling.

Examples of the base catalyst include: alkali metal hydroxides such as lithium hydroxide, sodium hydroxide, potassium hydroxide, and cesium hydroxide; ammonium compounds such as ammonium hydroxide, ammonium fluoride, ammonium chloride, and ammonium bromide; basic phosphoric acid sodium salts such as sodium metaphosphate, sodium pyrophosphate, and sodium polyphosphate; aliphatic amines such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, t-butylamine, sec-butylamine, propylamine, 3-(methylamino)propylamine, 3-(dimethylamino)propylamine, 3-methoxyamine, dimethylethanolamine, methyldiethanolamine, diethanolamine, and triethanolamine; and nitrogen-containing heterocyclic compounds such as morpholine, N-methylmorpholine, 2-methylmorpholine, piperazine and derivatives thereof, piperidine and derivatives thereof, and imidazole and derivatives thereof. Among these, ammonium hydroxide (ammonia water) is excellent in terms of not impairing water resistance because of being highly volatile and being less likely to remain in the aerogel after drying, and furthermore, in terms of economic efficiency. The base catalysts described above may be used alone or by mixing two or more types.

The dehydration condensation reaction and/or dealcoholization condensation reaction of the polysiloxane compound group and the silicon compound group in the sol can be accelerated, and the gelling of the sol can be performed in a shorter time, by using the base catalyst. By this, wet gel having higher strength (rigidity) can also be obtained. Since, particularly, ammonia is highly volatile and is less likely to remain in the aerogel, aerogel having much better water resistance can be obtained by using ammonia as the base catalyst.

The amount of the base catalyst added can be set to 0.5 to 5 parts by mass, but may be further set to 1 to 4 parts by mass, with respect to 100 parts by mass in total of the polysiloxane compound group and the silicon compound group. The amount added is set to 0.5 parts by mass or more, whereby the gelling can be performed in a shorter time; and it is set to 5 parts by mass or less, whereby reduction in water resistance can be further suppressed.

The gelling of the sol in the wet gel production step may be performed in a closed vessel such that the solvent and the base catalyst do not volatilize. The gelling temperature can be set to 30 to 90° C., but may be further set to 40 to 80° C. The gelling temperature is set to 30° C. or higher, whereby the gelling can be performed in a shorter time, and wet gel having higher strength (rigidity) can be obtained. Also, the gelling temperature is set to 90° C. or lower, whereby the gelling can be performed with volume shrinkage suppressed because the volatilization of the solvent (particularly, an alcohol) is easily suppressed.

The aging in the wet gel production step may be performed in a closed vessel such that the solvent and the base catalyst do not volatilize. By the aging, the bond of components constituting the wet gel is strengthened, and as a result, wet gel having high strength (rigidity) sufficient for suppressing shrinkage at the time of drying can be obtained. The aging temperature can be set to 30 to 90° C., but may be further set to 40 to 80° C. The aging temperature is set to 30° C. or higher, whereby wet gel having higher strength (rigidity) can be obtained; and the aging temperature is set to 90° C. or lower, whereby the gelling can be performed with volume shrinkage suppressed because the volatilization of the solvent (particularly, an alcohol) is easily suppressed.

Because it is often difficult to determine the completion of the gelling of the sol, the gelling of the sol and the subsequent aging may be performed continuously by a series of operations.

Although the gelling time and the aging time differ depending on the gelling temperature and the aging temperature, the gelling time and the aging time in total can be set to 4 to 480 hours and may be further set to 6 to 120 hours. The gelling time and the aging time in total are set to 4 hours or longer, whereby wet gel having higher strength (rigidity) can be obtained; and they are set to 480 hours or shorter, whereby the effect of the aging is more easily maintained.

In order to decrease the density of the resulting aerogel or increase the average pore size, the gelling temperature and the aging temperature can be elevated within the range described above, and the total time of the gelling time and the aging time can be prolonged within the range described above. Also, in order to increase the density of the resulting aerogel or decrease the average pore size, the gelling temperature and the aging temperature can be lowered within the range described above, and the total time of the gelling time and the aging time can be shortened within the range described above.

(Washing and Solvent Replacement Step)

The washing and solvent replacement step is a step having a step of washing the wet gel obtained by the wet gel production step (washing step), and a step of replacing the washes in the wet gel with a solvent suitable for dry conditions (drying step mentioned later) (solvent replacement step). Although the washing and solvent replacement step may be carried out in a mode of performing only the solvent replacement step without performing the step of washing the wet gel, the wet gel may be washed from the viewpoint of reducing impurities such as unreacted products and by-products in the wet gel, and permitting manufacture of aerogel having higher purity.

In the washing step, the wet gel obtained in the wet gel production step is washed. The washing can be repetitively performed by using, for example, water or an organic solvent. In this respect, washing efficiency can be improved by warming.

Various organic solvents such as methanol, ethanol, 1-propanol, 2-propanol, 1-butanol, acetone, methyl ethyl ketone, 1,2-dimethoxyethane, acetonitrile, hexane, toluene, diethyl ether, chloroform, ethyl acetate, tetrahydrofuran, methylene chloride, N,N-dimethylformamide, dimethyl sulfoxide, acetic acid, and formic acid can be used as the organic solvent. The organic solvents described above may be used alone or by mixing two or more types.

In the solvent replacement step mentioned later, a solvent having low surface tension can be used for suppressing the shrinkage of the gel caused by drying. However, the solvent having low surface tension generally has very low mutual solubility in water. Therefore, in the case of using the solvent having low surface tension in the solvent replacement step, examples of the organic solvent used in the washing step include a hydrophilic organic solvent having high mutual solubility in both of water and the solvent having low surface tension. The hydrophilic organic solvent used in the washing step can play a role in preliminary replacement for the solvent replacement step. Among the organic solvents described above, examples of the hydrophilic organic solvent include methanol, ethanol, 2-propanol, acetone, and methyl ethyl ketone. Methanol, ethanol, methyl ethyl ketone or the like is excellent in terms of economic efficiency.

The amount of water or the organic solvent used in the washing step can be set to an amount that can sufficiently replace the solvent in the wet gel and permit washing. The amount can be set to an amount of 3 to 10 times the volume of the wet gel. The washing can be repeated until the water content in the wet gel after the washing becomes 10% by mass or less with respect to the silica mass.

The temperature environment in the washing step can be set to a temperature equal to or lower than the boiling point of the solvent used in washing, and in the case of using, for example, methanol, warming on the order of 30 to 60° C. can be performed.

In the solvent replacement step, the solvent of the washed wet gel is replaced with a predetermined solvent for replacement in order to suppress shrinkage in the drying step mentioned later. In this respect, replacement efficiency can be improved by warming Specific examples of the solvent for replacement include a solvent having low surface tension mentioned later, in the case of drying under atmospheric pressure at a temperature lower than the critical point of the solvent used in drying in the drying step. On the other hand, in the case of performing supercritical drying, examples of the solvent for replacement include ethanol, methanol, 2-propanol, dichlorodifluoromethane, carbon dioxide, and a mixed solvent of two or more of these.

Examples of the solvent having low surface tension include solvents whose surface tension at 20° C. is 30 mN/m or lower. The surface tension may be 25 mN/m or lower and may be 20 mN/m or lower. Examples of the solvent having low surface tension include: aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); aromatic hydrocarbons such as benzene (28.9), toluene (28.5), m-xylene (28.7), and p-xylene (28.3); halogenated hydrocarbons such as dichloromethane (27.9), chloroform (27.2), carbon tetrachloride (26.9), 1-chloropropane (21.8), and 2-chloropropane (18.1); ethers such as ethyl ether (17.1), propyl ether (20.5), isopropyl ether (17.7), butyl ethyl ether (20.8), and 1,2-dimethoxyethane (24.6); ketones such as acetone (23.3), methyl ethyl ketone (24.6), methyl propyl ketone (25.1), and diethyl ketone (25.3); and esters such as methyl acetate (24.8), ethyl acetate (23.8), propyl acetate (24.3), isopropyl acetate (21.2), isobutyl acetate (23.7), and ethyl butyrate (24.6) (the surface tension at 20° C. is indicated within the parentheses, and the unit is [mN/m]). Among these, aliphatic hydrocarbons (hexane, heptane, etc.) have low surface tension and are excellent in working environmental performance. Also, among these, a hydrophilic organic solvent such as acetone, methyl ethyl ketone, or 1,2-dimethoxyethane is used and thereby, can also serve as the organic solvent in the washing step. Among these, a solvent whose boiling point at normal pressure is 100° C. or lower may be used from the viewpoint that drying in the drying step mentioned later is easy. The organic solvents described above may be used alone or by mixing two or more types.

The amount of the solvent used in the solvent replacement step can be set to an amount that can sufficiently replace the solvent in the wet gel after the washing. The amount can be set to an amount of 3 to 10 times the volume of the wet gel.

The temperature environment in the solvent replacement step can be set to a temperature equal to or lower than the boiling point of the solvent used in replacement, and in the case of using, for example, heptane, warming on the order of 30 to 60° C. can be performed.

(Drying Step)

In the drying step, the wet gel washed and solvent-replaced as described above is dried. By this, the aerogel can be finally obtained. Specifically, aerogel prepared by drying the wet gel produced from the sol can be obtained.

The drying approach is not particularly limited, and publicly known drying under normal pressure, supercritical drying or freeze drying can be used. Among these, drying under normal pressure or supercritical drying can be used from the viewpoint of easily manufacturing aerogel having a low density. Also, drying under normal pressure can be used from the viewpoint that production at a low cost is possible. In the present embodiment, the normal pressure means 0.1 MPa (atmospheric pressure).

The aerogel of the present embodiment can be obtained by drying the washed and solvent-replaced wet gel under atmospheric pressure at a temperature lower than the critical point of the solvent used in drying. Considering that, particularly, drying at a high temperature may accelerate the evaporation rate of the solvent and result in large cracks in gel, the drying temperature can be set to 20 to 80° C., though differing depending on the type of the replaced solvent. The drying temperature may be further set to 30 to 60° C. The drying time can be set to 4 to 120 hours, though differing depending on the volume of the wet gel and the drying temperature. In the present embodiment, the acceleration of drying by applying pressure within a range not inhibiting productivity is also encompassed by the drying under normal pressure.

The aerogel of the present embodiment can also be obtained by supercritically drying the washed and solvent-replaced wet gel. The supercritical drying can be performed by a publicly known approach. Examples of the supercritical drying method include a method of removing a solvent at a temperature and a pressure equal to or higher than the critical point of the solvent contained in the wet gel. Alternatively, examples of the supercritical drying method include a method of dipping the wet gel in liquid carbon dioxide under conditions on the order of, for example, 20 to 25° C. and 5 to 20 MPa to replace the whole or a portion of the solvent contained in the wet gel with carbon dioxide having a lower critical point than that of the solvent, and then removing the carbon dioxide alone or a mixture of the carbon dioxide and the solvent.

The aerogel obtained by such drying under normal pressure or supercritical drying may be further subjected to additional drying under normal pressure at 105 to 200° C. for approximately 0.5 to 2 hours. By this, aerogel having a low density and having small pores is more easily obtained. The additional drying can be performed under normal pressure at 150 to 200° C.

The aerogel of the present embodiment obtained through the steps mentioned above has excellent thermal insulation properties and productivity which have been difficult to achieve by conventional aerogel. From such advantages, it can be applied to purposes, etc. as thermal insulating materials in the architecture field, the automobile field, the field of household appliances, the semiconductor field, industrial facilities and the like. Also, the aerogel of the present embodiment can be used as additives for coating materials, cosmetics, anti-blocking agents, catalyst supports, and the like in addition to the purposes as thermal insulating materials.

EXAMPLES

Although the present invention will be further specifically described next with reference to Examples described below, these Examples do not limit the present invention.

Preparation of Aerogel

Example 1

40.0 parts by mass of carbinol-modified siloxane "X-22-160AS" represented by the above formula (A) (product name, manufactured by Shin-Etsu Chemical Co., Ltd., average molecular weight: 932 g/mol) as a polysiloxane compound, 60.0 parts by mass of methyltrimethoxysilane "LS-530" (product name, manufactured by Shin-Etsu Chemical Co., Ltd.; hereinafter, abbreviated to "MTMS") as a silicon compound, 120.0 parts by mass of water and 80.0 parts by mass of methanol were mixed, and 0.10 parts by mass of acetic acid were added thereto as an acid catalyst, and reacted at 25° C. for 8 hours to obtain sol. 40.0 parts by mass of 5% concentration of ammonia water were added as a base catalyst to the obtained sol, which was gelled at 60° C. for 8 hours and then aged at 80° C. for 48 hours to obtain wet gel. Then, the obtained wet gel was dipped in 2500.0 parts by mass of methanol and washed at 60° C. over 12 hours. This washing operation was performed three times while the methanol was replaced with a fresh one. Next, the washed wet gel was dipped in 2500.0 parts by mass of heptane serving as a low-surface tension solvent, and solvent replacement was performed at 60° C. over 12 hours. This solvent replacement operation was performed three times while the heptane was replaced with a fresh one. The washed and solvent-replaced wet gel was dried under normal pressure at 40° C. for 96 hours and then further dried at 150° C. for 2 hours to obtain aerogel 1 having structures represented by the above formulas (1) and (1a).

Example 2

200.0 parts by mass of water, 0.10 parts by mass of acetic acid as an acid catalyst, 20.0 parts by mass of cetyl trimethyl ammonium bromide (manufactured by Wako Pure Chemical Industries, Ltd.; hereinafter, abbreviated to "CTAB") as a cationic surfactant and 120.0 parts by mass of urea as a thermally hydrolyzable compound were mixed, and 40.0 parts by mass of X-22-160AS represented by the above formula (A) as a polysiloxane compound and 60.0 parts by mass of MTMS as a silicon compound were added thereto and reacted at 25° C. for 2 hours to obtain sol. The obtained sol was gelled at 60° C. for 8 hours and then aged at 80° C. for 48 hours to obtain wet gel. Then, aerogel 2 having structures represented by the above formulas (1) and (1a) was obtained in the same way as in Example 1.

Example 3

200.0 parts by mass of water, 0.10 parts by mass of acetic acid as an acid catalyst, 20.0 parts by mass of CTAB as a cationic surfactant and 120.0 parts by mass of urea as a thermally hydrolyzable compound were mixed, and 40.0 parts by mass of a both terminally difunctional alkoxy-modified polysiloxane compound represented by the above formula (B) (hereinafter, referred to as "polysiloxane compound A", average molecular weight: 966 g/mol) as a polysiloxane compound and 60.0 parts by mass of MTMS as a silicon compound were added thereto and reacted at 25° C.

for 2 hours to obtain sol. The obtained sol was gelled at 60° C. for 8 hours and then aged at 80° C. for 48 hours to obtain wet gel. Then, aerogel 3 having ladder-type structures represented by the above formulas (2) and (3) was obtained in the same way as in Example 1.

The "polysiloxane compound A" was synthesized as follows: first, in a 1 L three-neck flask equipped with a stirrer, a thermometer and a Dimroth condenser, 100.0 parts by mass of hydroxy-terminated dimethylpolysiloxane "XC96-723" (product name, manufactured by Momentive Performance Materials Inc.), 181.3 parts by mass of methyltrimethoxysilane and 0.50 parts by mass of t-butylamine were mixed and reacted at 30° C. for 5 hours. Then, volatile matter was removed by heating this reaction solution under reduced pressure of 1.3 kPa at 140° C. for 2 hours, to obtain the both terminally difunctional alkoxy-modified polysiloxane compound (polysiloxane compound A).

Example 4

200.0 parts by mass of water, 0.10 parts by mass of acetic acid as an acid catalyst, 20.0 parts by mass of CTAB as a cationic surfactant and 120.0 parts by mass of urea as a thermally hydrolyzable compound were mixed, and 20.0 parts by mass of the polysiloxane compound A represented by the above formula (B) as a polysiloxane compound and 80.0 parts by mass of MTMS as a silicon compound were added thereto and reacted at 25° C. for 2 hours to obtain sol. The obtained sol was gelled at 60° C. for 8 hours and then aged at 80° C. for 48 hours to obtain wet gel. Then, aerogel 4 having ladder-type structures represented by the above formulas (2) and (3) was obtained in the same way as in Example 1.

Example 5

200.0 parts by mass of water, 0.10 parts by mass of acetic acid as an acid catalyst, 20.0 parts by mass of CTAB as a cationic surfactant and 120.0 parts by mass of urea as a thermally hydrolyzable compound were mixed, and 40.0 parts by mass of a both terminally trifunctional alkoxy-modified polysiloxane compound represented by the above formula (B) (hereinafter, referred to as "polysiloxane compound B", average molecular weight: 702 g/mol) as a polysiloxane compound and 60.0 parts by mass of MTMS as a silicon compound were added thereto and reacted at 25° C. for 2 hours to obtain sol. The obtained sol was gelled at 60° C. for 8 hours and then aged at 80° C. for 48 hours to obtain wet gel. Then, aerogel 5 having ladder-type structures represented by the above formulas (2) and (3) was obtained in the same way as in Example 1.

The "polysiloxane compound B" was synthesized as follows: first, in a 1 L three-neck flask equipped with a stirrer, a thermometer and a Dimroth condenser, 100.0 parts by mass of XC96-723, 202.6 parts by mass of tetramethoxysilane and 0.50 parts by mass of t-butylamine were mixed and reacted at 30° C. for 5 hours. Then, volatile matter was removed by heating this reaction solution under reduced pressure of 1.3 kPa at 140° C. for 2 hours, to obtain the both terminally trifunctional alkoxy-modified polysiloxane compound (polysiloxane compound B).

Example 6

200.0 parts by mass of water, 0.10 parts by mass of acetic acid as an acid catalyst, 20.0 parts by mass of CTAB as a cationic surfactant and 120.0 parts by mass of urea as a thermally hydrolyzable compound were mixed, and 20.0 parts by mass of the polysiloxane compound B represented by the above formula (B) as a polysiloxane compound and 80.0 parts by mass of MTMS as a silicon compound were added thereto and reacted at 25° C. for 2 hours to obtain sol. The obtained sol was gelled at 60° C. for 8 hours and then aged at 80° C. for 48 hours to obtain wet gel. Then, aerogel 6 having ladder-type structures represented by the above formulas (2) and (3) was obtained in the same way as in Example 1.

Comparative Example 1

200.0 parts by mass of water, 0.10 parts by mass of acetic acid as an acid catalyst, 20.0 parts by mass of CTAB as a cationic surfactant and 120.0 parts by mass of urea as a thermally hydrolyzable compound were mixed, and 100.0 parts by mass of MTMS were added thereto as a silicon compound and reacted at 25° C. for 2 hours to obtain sol. The obtained sol was gelled at 60° C. for 8 hours and then aged at 80° C. for 48 hours to obtain wet gel. Then, aerogel 7 was obtained in the same way as in Example 1.

Comparative Example 2

200.0 parts by mass of water, 0.10 parts by mass of acetic acid as an acid catalyst, 20.0 parts by mass of CTAB as a cationic surfactant and 120.0 parts by mass of urea as a thermally hydrolyzable compound were mixed, and 70.0 parts by mass of MTMS and 30.0 parts by mass of dimethyldimethoxysilane "LS-520" (product name, manufactured by Shin-Etsu Chemical Co., Ltd.; hereinafter, abbreviated to "DMDMS") were added thereto as silicon compounds and reacted at 25° C. for 2 hours to obtain sol. The obtained sol was gelled at 60° C. for 8 hours and then aged at 80° C. for 48 hours to obtain wet gel. Then, aerogel 8 was obtained in the same way as in Example 1.

Comparative Example 3

200.0 parts by mass of water, 0.10 parts by mass of acetic acid as an acid catalyst, 20.0 parts by mass of CTAB as a cationic surfactant and 120.0 parts by mass of urea as a thermally hydrolyzable compound were mixed, and 60.0 parts by mass of MTMS and 40.0 parts by mass of DMDMS were added thereto as silicon compounds and reacted at 25° C. for 2 hours to obtain sol. The obtained sol was gelled at 60° C. for 8 hours and then aged at 80° C. for 48 hours to obtain wet gel. Then, aerogel 9 was obtained in the same way as in Example 1.

Comparative Example 4

200.0 parts by mass of water, 0.10 parts by mass of acetic acid as an acid catalyst, 20.0 parts by mass of CTAB as a cationic surfactant and 120.0 parts by mass of urea as a thermally hydrolyzable compound were mixed, and 100.0 parts by mass of MTMS were added thereto as a silicon compound and reacted at 25° C. for 2 hours to obtain sol. The obtained sol was gelled at 60° C. for 8 hours and then aged at 80° C. for 48 hours to obtain wet gel. Then, the obtained wet gel was dipped in 2500.0 parts by mass of methanol and washed at 60° C. over 12 hours. This washing operation was performed three times while the methanol was replaced with a fresh one. Next, the washed wet gel was dipped in 2500.0 parts by mass of 2-propanol, and solvent replacement was performed at 60° C. over 12 hours. This solvent replacement operation was performed three times while the 2-propanol was replaced with a fresh one.

Next, the supercritical drying of the solvent-replaced wet gel was performed. The inside of an autoclave was filled with 2-propanol, and the solvent-replaced wet gel was placed. Then, liquid carbon dioxide was sent into the autoclave so that the inside of the autoclave was filled with a mixture of 2-propanol and carbon dioxide serving as a dispersion medium. Then, heat and pressure were applied such that the environment within the autoclave became 80° C. and 14 MPa, and carbon dioxide in a supercritical state was sufficiently circulated within the autoclave, followed by pressure reduction to remove 2-propanol and carbon dioxide contained in the gel. In this way, aerogel 10 was obtained.

The drying method and the Si raw materials (polysiloxane compound and silicon compound) in each Example and Comparative Example are summarized in Table 1.

[Various Evaluations]

Thermal conductivity, the compressive modulus of elasticity, the percentage of maximum compressive deformation, the percentage of deformation recovery, density and porosity were measured and evaluated as to the aerogels 1 to 10 obtained in Examples and Comparative Examples, in accordance with the conditions given below. The evaluation results are summarized in Table 2.

(1) Measurement of Thermal Conductivity

The aerogel was processed into a size of 150 mm×150 mm×100 mm by using a knife having a knife angle of approximately 20 to 25 degrees to prepare a measurement sample. Next, in order to secure surface parallelism, the shape was adjusted with #1500 or higher sandpaper, if necessary. The obtained measurement sample was dried under atmospheric pressure at 100° C. for 30 minutes by using a constant-temperature dryer "DVS402" (product name, manufactured by Yamato Scientific Co., Ltd.) before thermal conductivity measurement. Subsequently, the measurement sample was transferred into a desiccator and cooled to 25° C.

The measurement of the thermal conductivity was performed by using a steady-state thermal conductivity measurement apparatus "HFM 436 Lambda" (product name, manufactured by NETZSCH). The measurement conditions were set to an average temperature of 25° C. under atmospheric pressure. The measurement sample obtained as described above was sandwiched between upper and lower heaters under a load of 0.3 MPa, and the upper surface temperature, lower surface temperature, etc. of the measurement sample were measured with temperature difference $\Delta T$ set to 20° C., while heat flow was adjusted to be one-dimensional with a guard heater. Then, thermal resistance $R_S$ of the measurement sample was determined according to the following expression:

$$R_S = N((T_U - T_L)/Q) - R_O$$

In the expression, $T_U$ represents the upper surface temperature of the measurement sample, $T_L$ represents the lower surface temperature of the measurement sample, $R_O$ represents the contact thermal resistance of the upper and lower interfaces, and Q represents the output of the heat flux meter. N is a proportionality coefficient and was determined in advance by using a calibration sample.

From the obtained thermal resistance $R_S$, thermal conductivity $\lambda$ of the measurement sample was determined according to the following expression:

$$\lambda = d/R_S$$

In the expression, d represents the thickness of the measurement sample.

(2) Measurement of Compressive Modulus of Elasticity, Percentage of Maximum Compressive Deformation and Percentage of Deformation Recovery The aerogel was processed into a cube (dice-shaped) of 7.0 mm square by using a knife having a knife angle of approximately 20 to 25 degrees to prepare a measurement sample. Next, in order to secure surface parallelism, the shape of the measurement sample was adjusted with #1500 or higher sandpaper, if necessary. The obtained measurement sample was dried under atmospheric pressure at 100° C. for 30 minutes by using a constant-temperature dryer "DVS402" (product name, manufactured by Yamato Scientific Co., Ltd.) before thermal conductivity measurement. Subsequently, the measurement sample was transferred into a desiccator and cooled to 25° C.

A compact table-top tester "EZ Test" (product name, manufactured by Shimadzu Corp.) was used as a measurement apparatus. 500 N was used as a load cell. Also, a stainless upper platen (φ20 mm) and lower platen (φ118 mm) were used as tools for compression measurement. The measurement sample was loaded between the upper platen and the lower platen arranged parallelly, and compression was performed at a rate of 1 mm/min. The measurement temperature was set to 25° C., and the measurement was terminated when a load exceeding 500 N was applied or when the measurement sample broke. Here, strain ε was determined according to the following expression:

$$\varepsilon = \Delta d/d1$$

In the expression, $\Delta d$ represents the displacement (mm) of the thickness of the measurement sample caused by the load, and d1 represents the thickness (mm) of the measurement sample before the application of the load.

Also, compressive stress σ (MPa) was determined according to the following expression:

$$\sigma = F/A$$

In the expression, F represents compressive force (N), and A represents the cross-sectional area (mm²) of the measurement sample before the application of the load.

Compressive modulus E of elasticity (MPa) was determined according to the following expression in a compressive force range of 0.1 to 0.2 N:

$$E = (\sigma_2 - \sigma_1)/(\varepsilon_2 - \varepsilon_1)$$

In the expression, $\sigma_1$ represents compressive stress (MPa) measured at the compressive force of 0.1 N, $\sigma_2$ represents compressive stress (MPa) measured at the compressive force of 0.2 N, $\varepsilon_1$ represents compressive strain measured at the compressive stress $\sigma_1$, and $\varepsilon_2$ represents compressive strain measured at the compressive stress $\sigma_2$.

When the thickness of the measurement sample before the application of the load was defined as d1, the thickness when the largest load of 500 N was applied or when the measurement sample broke was defined as d2, and the thickness of the measurement sample after removal of the load was defined as d3, the percentage of deformation recovery and the percentage of maximum compressive deformation were calculated according to the following expression:

Percentage of deformation recovery = $(d3-d2)/(d1-d2) \times 100$

Percentage of maximum compressive deformation = $(d1-d2)/d1 \times 100$ (3) Measurement of Density and Porosity The median pore size, density and porosity of continuous holes (pores) in a three-dimensional network pattern were measured as to the aerogel by the mercury intrusion method in accordance with DIN66133. The measurement temperature was set to room temperature (25° C.), and AutoPore IV 9520 (product name, manufactured by Shimadzu Corp.) was used as a measurement apparatus.

TABLE 1

|  | Drying method | Si raw material Type | Amount added (part by mass) |
|---|---|---|---|
| Example 1 | Normal pressure | X-22-160AS<br>MTMS | 40.0<br>60.0 |
| Example 2 | Normal pressure | X-22-160AS<br>MTMS | 40.0<br>60.0 |
| Example 3 | Normal pressure | Polysiloxane compound A<br>MTMS | 40.0<br>60.0 |
| Example 4 | Normal pressure | Polysiloxane compound A<br>MTMS | 20.0<br>80.0 |
| Example 5 | Normal pressure | Polysiloxane compound B<br>MTMS | 40.0<br>60.0 |
| Example 6 | Normal pressure | Polysiloxane compound B<br>MTMS | 20.0<br>80.0 |
| Comparative Example 1 | Normal pressure | MTMS | 100.0 |
| Comparative Example 2 | Normal pressure | MTMS<br>DMDMS | 70.0<br>30.0 |
| Comparative Example 3 | Normal pressure | MTMS<br>DMDMS | 60.0<br>40.0 |
| Comparative Example 4 | Supercritical | MTMS | 100.0 |

TABLE 2

|  | Thermal conductivity (W/m·K) | Compressive modulus of elasticity (MPa) | Percentage of deformation recovery (%) | Percentage of maximum compressive deformation (%) | Density (g/cm³) | Porosity (%) |
|---|---|---|---|---|---|---|
| Example 1 | 0.027 | 0.20 | 94.6 | 87.2 | 0.19 | 88.7 |
| Example 2 | 0.022 | 0.68 | 95.5 | 86.8 | 0.17 | 89.0 |
| Example 3 | 0.019 | 0.94 | 95.2 | 86.0 | 0.17 | 90.5 |
| Example 4 | 0.016 | 1.64 | 93.2 | 84.2 | 0.16 | 91.2 |
| Example 5 | 0.018 | 0.10 | 94.2 | 85.0 | 0.17 | 91.5 |
| Example 6 | 0.015 | 1.84 | 92.2 | 83.2 | 0.16 | 92.2 |
| Comparative Example 1 | 0.017 | 7.40 | Breakage | 17.3 | 0.17 | 91.2 |
| Comparative Example 2 | 0.041 | 1.25 | 92.5 | 84.3 | 0.18 | 86.8 |
| Comparative Example 3 | 0.045 | 0.15 | 96.2 | 87.6 | 0.19 | 86.4 |
| Comparative Example 4 | 0.017 | 7.38 | Breakage | 15.8 | 0.16 | 92.2 |

From Table 2, it is understood that all of the aerogels of Examples have thermal conductivity of 0.03 W/m·K or smaller, a compressive modulus of elasticity of 2 MPa or lower, a percentage of deformation recovery of 90% or more, and a percentage of maximum compressive deformation of 80% or more, and have thermal insulation properties and flexibility.

On the other hand, Comparative Example 1 and Comparative Example 4 were fragile to deformation due to the large compressive modulus of elasticity and were easily broken, though the thermal conductivity was 0.03 W/m·K or smaller. Also, Comparative Example 2 had large thermal conductivity. Comparative Example 3 had large thermal conductivity, though the flexibility was sufficient.

INDUSTRIAL APPLICABILITY

The aerogel of the present invention has excellent thermal insulation properties and flexibility which have been difficult to achieve by conventional aerogel. From such advantages, it can be applied to purposes, etc. as thermal insulating materials in the architecture field, the automobile field, the field of household appliances, the semiconductor field, industrial facilities and the like. Also, the aerogel of the present invention can be used as additives for coating materials, cosmetics, anti-blocking agents, catalyst supports, and the like in addition to the purposes as thermal insulating materials.

The invention claimed is:

1. Aerogel being a dried product of wet gel being a condensate of sol containing at least one selected from the group consisting of a polysiloxane compound having a hydrolyzable functional group or a condensable functional group and having an average molecular weight of 300 to 1500 g/mol, and a hydrolysis product of the polysiloxane compound having a hydrolyzable functional group, wherein the aerogel has a ladder-type structure having struts and bridges, wherein the bridges are represented by the following formula (2):

[Chemical Formula 3]

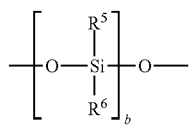

(2)

wherein $R^5$ and $R^6$ each independently represent an alkyl group or an aryl group, and b represents an integer of 3 to 15.

2. The aerogel according to claim 1, wherein the aerogel has a ladder-type structure represented by the following formula (3):

[Chemical Formula 4]

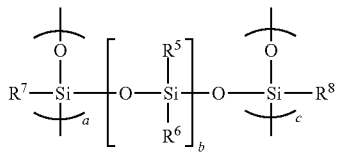

(3)

wherein $R^5$, $R^6$, $R^7$ and $R^8$ each independently represent an alkyl group or an aryl group, a and c each independently represent an integer of 1 to 3000, and b represents an integer of 3 to 15.

3. The aerogel according to claim 1 wherein the hydrolyzable functional group is an alkoxy group.

4. The aerogel according to claim 3, wherein the number of carbon atoms of the alkoxy group is 1 to 6.

5. The aerogel according to claim 3, wherein the polysiloxane compound is a polysiloxane compound represented by the following formula (B):

[Chemical Formula 6]

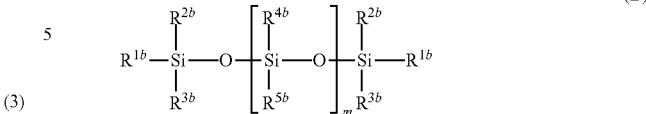

(B)

wherein $R^{1b}$ represents an alkyl group, an alkoxy group or an aryl group, $R^{2b}$ and $R^{3b}$ each independently represent an alkoxy group, $R^{4b}$ and $R^{5b}$ each independently represent an alkyl group or an aryl group, and m represents an integer of 3 to 15.

6. The aerogel according to claim 1, wherein the sol further contains at least one selected from the group consisting of a silicon compound having a hydrolyzable functional group or a condensable functional group, and a hydrolysis product of the silicon compound having a hydrolyzable functional group.

7. The aerogel according to claim 1, wherein the dried product is obtained by drying performed at a temperature lower than a critical point of a solvent used in the drying of the wet gel, and under atmospheric pressure.

* * * * *